(12) United States Patent
Gao

(10) Patent No.: US 10,358,185 B2
(45) Date of Patent: Jul. 23, 2019

(54) ELECTRIC VEHICLE CENTRAL SHAFT TORQUE SENSING SYSTEM

(71) Applicant: TAICANG RONGCHI MOTOR CO., LTD, Jiangsu (CN)

(72) Inventor: Feng Gao, Jiangsu (CN)

(73) Assignee: TAICANG RONGCHI MOTOR CO., LTD, Jiangsu (CN)

( * ) Notice: Subject to any disclaimer, the term of this patent is extended or adjusted under 35 U.S.C. 154(b) by 114 days.

(21) Appl. No.: 15/522,837

(22) PCT Filed: Dec. 16, 2014

(86) PCT No.: PCT/CN2014/001134
§ 371 (c)(1),
(2) Date: Apr. 28, 2017

(87) PCT Pub. No.: WO2016/065500
PCT Pub. Date: May 6, 2016

(65) Prior Publication Data
US 2017/0320539 A1    Nov. 9, 2017

(30) Foreign Application Priority Data

Oct. 31, 2014   (CN) .......................... 2014 1 0605218

(51) Int. Cl.
*B62M 6/50*       (2010.01)
*B62M 3/00*       (2006.01)
(Continued)

(52) U.S. Cl.
CPC .............. *B62M 6/50* (2013.01); *B62M 3/003* (2013.01); *G01L 3/104* (2013.01); *G01L 3/108* (2013.01);
(Continued)

(58) Field of Classification Search
CPC .... B62M 3/003; B62M 6/50; B62J 2099/002; G01L 3/104; G01L 3/108; G01L 5/221; H04B 1/04
(Continued)

(56) References Cited

U.S. PATENT DOCUMENTS

2005/0077096 A1*   4/2005   Kokatsu ................... B62M 6/45
                                                                180/207.1
2016/0159434 A1*   6/2016   Huang ..................... B62M 6/45
                                                                701/67

FOREIGN PATENT DOCUMENTS

CN        103381875 A     11/2013
CN        103381876 A     11/2013
(Continued)

OTHER PUBLICATIONS

International Search Report of PCT/CN2014/001134, dated Jul. 1, 2015. [PCT/ISA/210].

*Primary Examiner* — Kevin Hurley
*Assistant Examiner* — Felicia L. Brittman
(74) *Attorney, Agent, or Firm* — Sughrue Mion, PLLC

(57) ABSTRACT

An electric bicycle central shaft torque sensing system, comprising a central shaft, a strain sleeve, a pedalling force output portion, a torque sensor and a five-way piece, one end of the strain sleeve being fixed on the five-way piece via a bearing and connected to the pedalling force output portion, another end being sleeved on the central shaft and fixedly connected thereto, an inner surface of the strain sleeve fitting with an outer surface of the central shaft, an outer surface of the strain sleeve being adhered to the torque sensor, the torque sensor transmitting a signal to a controller via a signal transmitter, the controller controlling motor output. The present invention prevents the current widespread phenomenon of unbalanced left/right foot detection during measurement by a torque sensing system. Measured radial torque (Continued)

accurately reflects the pedalling force, and a sprocket is driven via the strain sleeve whether the left foot or the right foot is pedalling, thereby ensuring smooth riding and increasing riding comfort.

10 Claims, 3 Drawing Sheets

(51) Int. Cl.
    *G01L 3/10*     (2006.01)
    *G01L 5/22*     (2006.01)
    *B62J 99/00*     (2009.01)
    *H04B 1/04*     (2006.01)

(52) U.S. Cl.
    CPC ......... *G01L 5/221* (2013.01); *B62J 2099/002* (2013.01); *H04B 1/04* (2013.01)

(58) Field of Classification Search
    USPC .................................... 280/206.4; 180/206.4
    See application file for complete search history.

(56) References Cited

FOREIGN PATENT DOCUMENTS

| | | |
|---|---|---|
| CN | 103661762 A | 3/2014 |
| CN | 103879505 A | 6/2014 |
| CN | 203806093 U | 9/2014 |
| CN | 204110305 U | 1/2015 |
| EP | 2 216 242 B1 | 4/2012 |
| JP | 2000-335475 A | 12/2000 |

\* cited by examiner

ELECTRIC VEHICLE CENTRAL SHAFT TORQUE SENSING SYSTEM

CROSS REFERENCE TO RELATED APPLICATIONS

This application is a National Stage of International Application No. PCT/CN2014/001134 filed Dec. 16, 2014, claiming priority based on Chinese Patent Application No. 201410605218.X, filed Oct. 31, 2014, the contents of all of which are incorporated herein by reference in their entirety.

TECHNICAL FIELD

The present invention relates to a power-assisted sensing system for an electric bicycle, and particularly to a central shaft torque sensing system for an electric bicycle.

BACKGROUND

Electric bicycle power-assisted sensor applied to an intelligent electric power-assist bicycle, is one of the core components of an intelligent electric bicycle. Now the commonly used electric bicycle power-assisted sensor has following several schemes: (1) A speed-type pseudo power-assisted sensor by counting motor pulses or central shaft pulses, increases an output of the motor accordingly by detecting an actual speed of the bicycle. (2) A set of elastic elements are mounted between a central shaft and a chainwheel or between a motor and a freewheel, utilizing a slip displacement of the elastic element after deforming under force to push corresponding mechanical action, producing physical quantity variations, such as magnetic field, quantity of light and so on, with some static sensing device, which is converted to electric quantity to detect a pedalling force of a rider. (3) a set of elastic elements is mounted between a central shaft and a chainwheel or between a motor and a freewheel, and pulse generating devices are mounted at both ends of the elastic elements, utilizing a slip displacement of the elastic element after deforming under force to produce a phase difference between two pulse trains, which converted via a phase discrimination circuit to detect a pedalling force. (4) a deformation body is disposed between a rotational central shaft and a sprocket bracket, is directly adhered to a strain gauge and is arranged with an amplification circuit, which is connected with the outer part using a slip ring and an electric brush. (5) a deformation body is disposed between a rotational central shaft and a sprocket bracket, on which a special material part is adhered, which produce permeance variation under force, causing a inductance variation of a coil assembly which is matched with it but does not rotate with it, converting into corresponding electric quantity by way of detecting a inductance or coupling coefficient. (6) an activity pinch roller is intentionally mounted on a chain major loop, detecting a displacement produced by the pinch roller under a chain tension, producing physical quantity variations, such as magnetic field, quantity of light and so on, with some static sensing device, which is converted to electric quantity to detect a pedalling force of a rider by a linearization conversion. In the above-mentioned six categories, the first one is simple, inexpensive and does not reflect reality, and is not easy to use when in heavy load, against the wind and go up the slope. An advantage of the other five ones is: all can meet usage requirements but each has its disadvantage, and common points are: the volume is large, the price is high, the structure is complex, the precision is low, the reliability is not enough, manufacture and assembling work are difficult.

An CN patent application number CN200710006002.1, entitled a scheme of electric bicycle power-assisted sensor utilizing a central shaft supporting piece to deform, provides a simple structured, relatively practical scheme for detecting a pedalling force. However, because its principle is achieved actually through measuring a deformation of the a strain sleeve caused by the chain tension, obtaining an equal pedalling force through detecting a strain gauge adhered to a strain sleeve, the structure inevitably can cause the central shaft slightly shake front and back, which spoils the riding feel and is of low practical use value.

In conclusion, people urgently need a central shaft torque sensing system that directly transmits a pedalling force to a strain sleeve. Wherein, what is reflected by a torque sensor on the strain sleeve is an actual pedalling force, the measurement of which is accurate, thereby preventing a phenomenon of unbalanced left/right foot detection during measurement by a torque sensing system.

SUMMARY OF THE INVENTION

In order to solve the above-mentioned technical problems, the object of the present invention is to provide a central shaft torque sensing system for an electric bicycle, wherein, one end of a strain sleeve is connected to a sprocket bracket, the other end is fixedly connected with a central shaft, a pedalling force is directly transmitted to the strain sleeve by the central shaft, then a signal is produced by a torque sensor arranged on the surface of the strain sleeve and is transmitted to a controller to control an output of the motor. In such a design, not only measured radial torque accurately reflects the pedalling force, but also a sprocket is driven via the strain sleeve whether the left foot or the right foot is pedalling, thereby ensuring smooth riding.

In order to realize the above-mentioned object of the invention, a technical solution provided by the present invention is: an electric bicycle central shaft torque sensing system, comprising a central shaft, a strain sleeve, a pedalling force output portion, a torque sensor and a five-way piece, one end of the strain sleeve being fixed on the five-way piece via a bearing and connected to the pedalling force output portion, another end of the strain sleeve being sleeved on the central shaft and fixedly connected thereto, an inner surface of the strain sleeve fitting with an outer surface of the central shaft, an outer surface of the strain sleeve being adhered to the torque sensor, the torque sensor transmitting a signal to a controller, the controller controlling motor output.

Furthermore, the pedalling force output portion is sleeved on the strain sleeve and the central shaft via a two-stage spline, the first spline is fixedly connected with one end of the strain sleeve, the second spline is connected with the central shaft, wherein the teeth and key slots of the second spline match via a torque travel clearance; the other end of the strain sleeve is fixedly connected with the central shaft via a third spline.

Furthermore, the torque sensor conducts signal transmission via a conductive slip ring, the conductive slip ring comprises a rotor portion and a stator portion, the rotor portion is fixedly mounted with the strain sleeve or the central shaft, the stator is fixedly mounted with the five-way piece or a fixed location of the frame.

Furthermore, a speed measuring device is disposed on the conductive slip ring.

Furthermore, magnet rings of magnet steel are mounted on the rotor portion in an annular spacing distribution, Hall sensors are mounted on the positions corresponding to the magnet rings.

Furthermore, the torque sensor is comprised of a half-bridge or full-bridge circuit formed by resistance strain gauge.

Furthermore, the torque sensor is formed by a torque sensing unit and a control unit.

Furthermore, the torque sensing unit is mounted on the sleeve to produce a torque signal, the torque sensing unit wirelessly transmits the signal to the control unit.

Furthermore, the central shaft torque sensing system is applied to a centre-mounted motor driven electric bicycle, front-mounted motor driven electric bicycle, or rear-mounted motor driven electric bicycle.

Furthermore, the pedalling force output portion is a sprocket bracket structure.

Employing above-mentioned technical solution, the beneficial effects of the present invention are:

1. The central shaft torque sensing system for an electric bicycle of the present invention, can control the power-assisted output of the motor accordingly as long as detecting a pedalling force, realizing the power-assisted effect of the electric bicycle, achieving the intelligentization of the electric bicycle.

2. Employing the design of the present invention, the current widespread phenomenon of unbalanced left/right foot detection during measurement by a torque sensing system is prevented, wherein measured radial torque accurately reflects the pedalling force, and a sprocket bracket is driven via the strain sleeve whether the left foot or the right foot is pedalling, thereby ensuring smooth riding and increasing riding comfort.

3. The current pedalling force of a user can be detected via a preferred speed measuring device, then an output of the motor is controlled by a controller, which is energy efficiency and environmental protection, and also can provide a best power-assisted effect of the riding.

4. The present invention is simple in structure, easy for manufacture, reduces a wear on the central shaft, and increases the service life of the product.

5. Because the strain sleeve and the central shaft on which the strain sleeve is sleeved are in slide fit and there exists a certain fit clearance between them, even if an abnormal situation occurs, such as someone trample at the pedal when a bicycle is parked, at this point the central shaft will produce a slight leverage deformation and the deformation are attenuated sharply after transmitted to the strain sleeve by a fit clearance, while taking into consideration of the strong rigidity of the central shaft and the very small amount of deformation itself, at this point a torque detected by the strain sleeve is much less than the torque during the normal trample, so the electric bicycle will not start outputting a motor actuation force, and will not start an error action. Therefore, the system overcomes the common defects of the current central shaft torque sensing system.

LIST OF REFERENCE NUMBERS

1 central shaft; 2 bearing; 3 rotor portion of conductive slip ring; 4 stator portion of conductive slip ring; 5 Hall sensor; 6 magnet ring; 7 torque sensor; 8 strain sleeve; 9 bearing; 10 sprocket bracket; 11 fluted discs; 12 first spline; 13 second spline; 131 torque travel clearance; 14 third spline; 15 magnification circuit plate.

DETAILED DESCRIPTION

Embodiment 1

Figure 1:
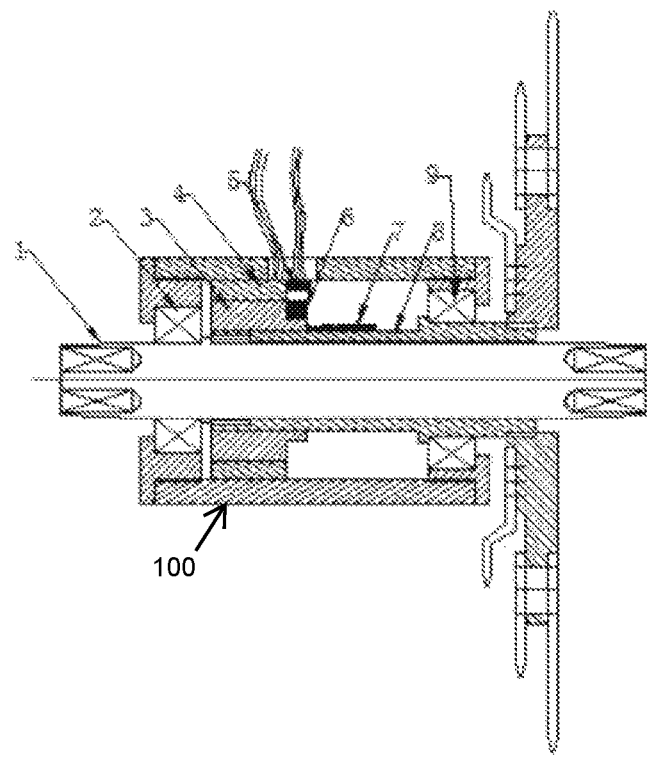
FIG. 1 is a schematic diagram of a structure of a central shaft torque sensing system of the present invention.
Figure 2:
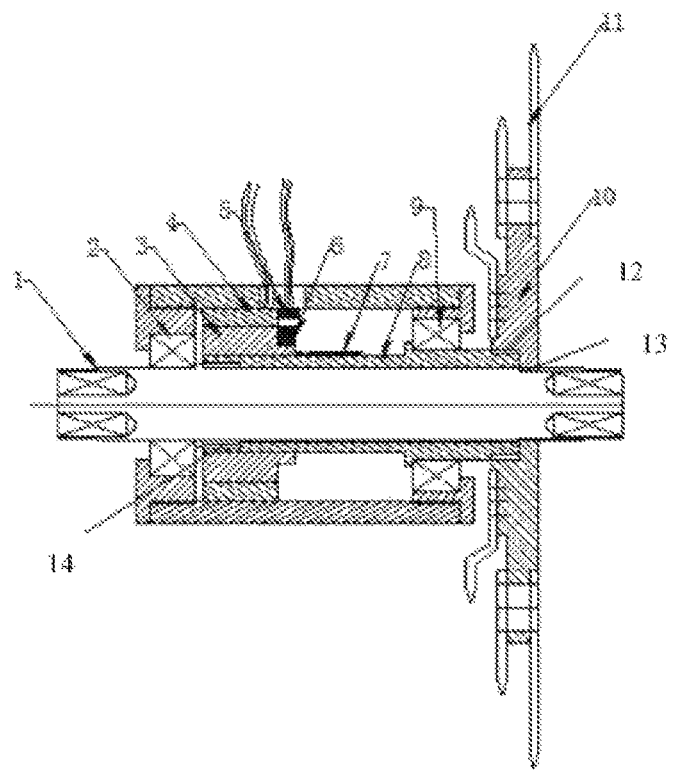
FIG. 2 is a schematic diagram of a structure of one embodiment of the present invention.

With reference to FIGS. 1-2, a central shaft torque sensing system for an electric bicycle is provided by the present invention, which comprises a central shaft 1, a strain sleeve 8, a sprocket bracket 10, a torque sensor 7 and a five-way piece 100, one end of the strain sleeve 8 being fixed on the five-way piece 100 via a bearing 2 and connected to a pedalling force output portion, the pedalling force output portion can assume multiple structures, such as a sprocket, a sprocket bracket, a dual ratchet and so on, it is not limited therein and is denoted as sprocket bracket 10 in this embodiment; The other end of the strain sleeve 8 is sleeved on the central shaft 1 and is fixedly connected with the central shaft, an inner surface of the strain sleeve fits with an outer surface of the central shaft, the sleeve and the central shaft can only turns slightly therebetween, and will not shake up, down, left and right. When a foot tramples a pedal regardless of whether is a left foot or a right foot, all the occurred pedalling forces are transmitted to the strain sleeve 8 through a junction between the central shaft and the sleeve, the pedalling forces are transmitted out by the other end of the sleeve via the sprocket bracket 10 to control a rotation of a wheel. The torque sensor 7 is adhered to an outer surface of the strain sleeve, the torque sensor transmit a signal to a signal transmission device, the signal transmission device is use to transmit the signal to a controller. In this embodiment, the signal transmission device is a conductive slip ring which connects the controller, the torque sensor connects the conductive slip ring, the sleeve is subjected to a rotation torsion to take place a slight torsional deformation during this process, causing the torque sensor to take place a deformation and to produce a pedal torque signal, the torque sensor transmit the signal to the controller for controlling an output of the motor.

Embodiment 2

Figure 4:
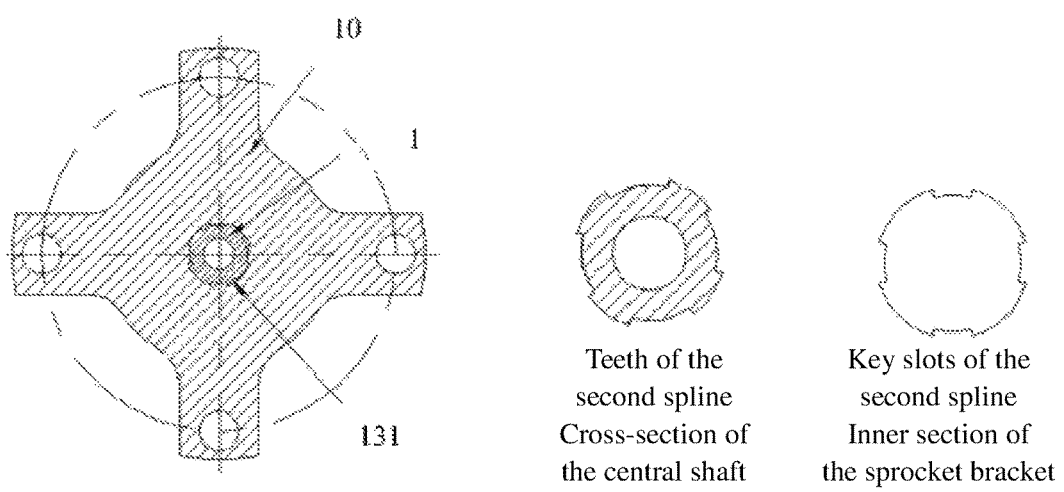
FIG. 4 is a schematic diagram of a cross section structure of another embodiment of the present invention.

With reference to FIGS. 2 and 4, the pedalling force is completely transmitted via a sleeve, it will probably to take place an irreversible deformation as come up against a violent trample. Although a more rigid material can be choosen, but meanwhile also can lead to the deformation of the sleeve is not enough in normal use, a signal sensed by the sensor is too low, leading to a reduction of the detection accuracy. Therefore the present invention preferably design a pedalling force direct path, after the pedalling force exceeds an upper limit, the central shaft transmits the pedalling force to the sprocket bracket 10 via the second spline 13. At this point the strain sleeve 8 no longer continues to deform, thereby achieving an effect of prolonging the service life of the sleeve. The sprocket bracket 10 is sleeved on the strain sleeve 8 and the central shaft 1 via a two-stage spline, wherein the first spline 12 is fixedly connected with the strain sleeve 8, although the second spline 13 and the central shaft 1 is in splined connection, the teeth and key slots present a torque travel clearance 131 fit.

When a foot does not pedal, the central shaft does not move, at this point the sleeve is not subjected to a torsion to deform, the sleeve and the central shaft do not take place relative rotation therebetween, the sprocket bracket fixed on the sleeve also does not rotate relative to the central shaft, so at this point the teeth and key slots of the second spline mantain a maximun torque travel clearance 131, as shown in FIG. 4.

When a foot normally exert itself to trample a pedal, the central shaft is subjected to a force, a torsion is transmitted to one end of the sleeve via the third spline, then the sleeve transmit the torsion to the sprocket bracket 10 via the first spline 12 of the other end, actuating the bicycle to move ahead. The sleeve subjected to a torsion takes place a slight deformation, causing the torque sensor 7 adhered on it produce a signal, which ultimately is transmitted to the controller and used to control a power-assisted output of the motor. In this process, because it is a normal pedalling force, a torsional deformation of the sleeve relative to the central shaft is within a certain range, the teeth and key slots of the second spline still move within the torque travel clearance and a transmission effect do not take place. This process is the normal work process of the electric bicycle.

When a pedalling force continues to increase, the amount of rotation of the teeth and key slots of the second spline exceed a torque travel clearance during above-mentioned normal working process, contact taking place, at this point the second spline begin to directly transmit the pedalling force, a torsion exceeding a designed amount of deformation of the sleeve is directly interrupted, an excessive pedalling force is directly transmitted to the sprocket bracket by the central shaft via the second spline.

Embodiment 3

Figure 3:
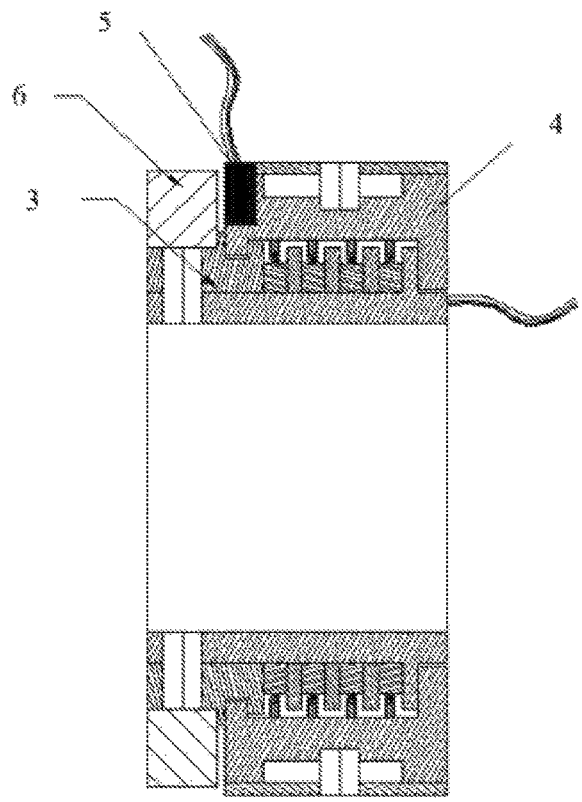
FIG. 3 is a schematic diagram of a cross-section structure of a speed measuring device in another embodiment of the present invention.

With reference to FIGS. 2-3, preferably, the signal of the torque sensor is magnified for transmitting which is used for being received by the controller, the present invention employs a conductive slip ring device, as shown in FIG. 2. The rotor portion 3 can be fixed with the strain sleeve or the central shaft, the stator portion 4 can be fixedly mounted with the five-way piece or other position that is fixed relative to the frame. Further preferably, a speed measuring device is disposed on the conductive slip ring, as shown in FIG. 3. A magnet ring 6 is mounted on the rotor portion in annular distribution, a Hall sensor 5 is mounted on a position corresponding the magnetic ring. The Hall sensor is a speed sensor, which detects a rotation speed of the central shaft or the sleeve, i.e. pedalling speed. The Hall sensor and torque sensor detect the pedalling speed or the pedalling force, and transmit the detection signal to the controller, and adjusts an output of the motor according to the signal. Such device applied in the present invention, in combination with the pedalling force and pedalling speed, is capable of achieving the best power-assisted riding effect by way of programming the controller, such as in the process of going up the slope, the pedalling speed is slow, the pedalling force is large, a corresponding motor power-assisted output increases; when goes downhill or on flat ground, the pedalling speed is fast, but little force is applied by the user, leading to the pedalling force is small, at this point the corresponding motor power-assisted output decreases, thereby obtaining a better riding experience.

Embodiment 4

In the present invention, according to the difference of the output pattern of the torque sensor signal, the signal transmission device can employ contact conduction such as the conductive slip ring in FIG. 3, or employ non-contact signal output such as a loosely coupled transformer or wireless transmission module, it is not limited herein. The torque sensor 7 employs a strain type torque measurement device, the torqeu sensor 7 can assume a resistance strain gauge sensor, the torque sensor 7 can be comprised of a half-bridge or full-bridge circuit formed by resistance strain gauge.

Non-contact central shaft torque measurement receives and transmits a torque detection signal by way of radio, the torque sensor 7 comprises a torque sensing unit and a control unit, the torque sensing uint mounted on the sleeve produces a torque signal, transmits a radio wave via an antenna, wirelessly transmits the signal to the control unit, and demodulates the torque signal by the control unit, thereby controls the output of the motor.

The signal outputted by the torque sensor in the present invention can also be directly transmitted to the controller without through an amplifier.

Embodiment 5

The electric bicycle central shaft torque sensing system of the present invention is applied to all of centre-mounted motor driven electric bicycle, front-mounted motor driven electric bicycle, or rear-mounted motor driven electric bicycle, and can control the power-assisted output of the motor accordingly as long as detecting the pedalling force, realizing the power-assisted effect of the electric bicycle.

Figure 5:
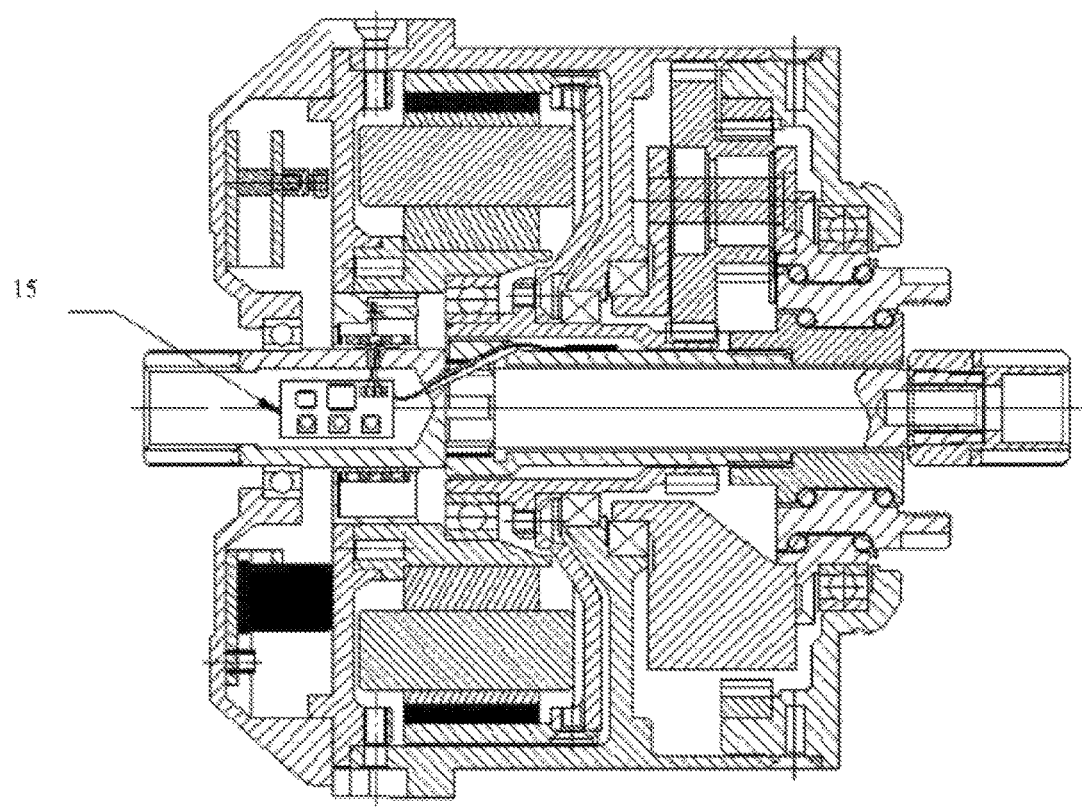
FIG. 5 is a schematic diagram of a structure of another embodiment of the present invention.

In the application of a centre-mounted motor driven electric bicycle, as shown in FIG. 5, magnification circuit plate 15 can be placed inside the central shaft, and then transmits the pedalling force signal out via the conductive slip ring, and the controller also can be directly mounted inside the motor, greatly facilitates the design and installation of the electric bicycle. The connection relationship of the motor and a reducing mechanism (planetary gear system) as well as a bidirectional clutch in the centre-mounted motor driven electric bicycle is disclosed in CN patents application number CN201320448104, entitled "centre-mounted motor driving system" or in CN patents application number CN200820111767.1, entitled "electric bicycle dual-ratchet clutch transmission device", which won't go into much detail here.

The above-mentioned embodiments are merely the possible implementations of the present invention, the description of which is relatively specific and detailed, but it can not therefore be interpreted as a limitation to the protection scope of the present invention. It should be pointed out that a number of modifications and improvements can also be made for a person skilled in the art without departing from the concept of the present invention, and all these modifications and improvements fall into the protection scope of the present invention.

The invention claimed is:

1. An electric bicycle central shaft torque sensing system, comprising a central shaft, a strain sleeve, a pedalling force output portion, a torque sensor and a five-way piece, wherein one end of the strain sleeve is fixed on the five-way piece via a bearing and connected to the pedalling force output portion, another end of the strain sleeve being sleeved on the central shaft and fixedly connected thereto, and an outer surface of the strain sleeve being adhered to the torque sensor, which transmits a signal to a controller, the controller controlling motor output.

2. The central shaft torque sensing system of claim 1, wherein the pedalling force output portion is sleeved on the strain sleeve and the central shaft via a two-stage spline, the pedalling force output portion is fixedly connected with one end of the strain sleeve via the first spline, the pedalling force output portion is connected with the central shaft via the second spline, wherein the teeth and key slots of the second spline match via a torque travel clearance; the other end of the strain sleeve is fixedly connected with the central shaft via a third spline.

3. The central shaft torque sensing system of claim 1, wherein the torque sensor transmits the signal to the controller via a signal transmitter, the signal transmitter is a conductive slip ring, which comprises a rotor portion and a stator portion, the rotor portion is fixedly mounted with the strain sleeve or the central shaft, the stator is fixedly mounted with the five-way piece or a fixed location of the frame.

4. The central shaft torque sensing system of claim 3, wherein a speed measuring device is disposed on the conductive slip ring.

5. The central shaft torque sensing system of claim 4, wherein magnet rings of magnet steel are mounted on the rotor portion in an annular spacing distribution, Hall sensors are mounted on the positions corresponding to the magnet rings.

6. The central shaft torque sensing system of claim 1, wherein the torque sensor transmits the signal to the controller via a signal transmitter, the signal transmitter is a loosely coupled transformer or wireless transmission module.

7. The central shaft torque sensing system of claim 1, wherein the torque sensor is comprised of a half-bridge or full-bridge circuit formed by a resistance strain gauge.

8. The central shaft torque sensing system of claim 1, wherein the torque sensor is formed by a torque sensing unit and a control unit, the torque sensing unit is mounted on the sleeve to produce a torque signal, the torque sensing unit wirelessly transmits the signal to the control unit.

9. The central shaft torque sensing system of claim 1, wherein the central shaft torque sensing system is applied to a centre-mounted motor driven electric bicycle, front-mounted motor driven electric bicycle, or rear-mounted motor driven electric bicycle.

10. The central shaft torque sensing system of claim 1, wherein an inner surface of the strain sleeve fits with an outer surface of the central shaft, the pedalling force output portion is a sprocket, a sprocket bracket, or a dual ratchet.

* * * * *